(12) United States Patent
Lin

(10) Patent No.: US 10,495,201 B2
(45) Date of Patent: Dec. 3, 2019

(54) POWER TRANSMISSION SYSTEM

(71) Applicant: Yao-Chang Lin, Hsinchu (TW)

(72) Inventor: Yao-Chang Lin, Hsinchu (TW)

(*) Notice: Subject to any disclaimer, the term of this patent is extended or adjusted under 35 U.S.C. 154(b) by 41 days.

(21) Appl. No.: 15/826,625

(22) Filed: Nov. 29, 2017

(65) Prior Publication Data

US 2019/0145506 A1    May 16, 2019

(30) Foreign Application Priority Data

Nov. 10, 2017   (TW) .............................. 106139070 A

(51) Int. Cl.

| | |
|---|---|
| *F16H 48/06* | (2006.01) |
| *F16H 37/08* | (2006.01) |
| *B64D 35/04* | (2006.01) |
| *B60K 17/348* | (2006.01) |
| *B60K 17/16* | (2006.01) |
| *F16H 48/08* | (2006.01) |

(52) U.S. Cl.
CPC ......... *F16H 37/0813* (2013.01); *B60K 17/16* (2013.01); *B60K 17/348* (2013.01); *B64D 35/04* (2013.01); *F16H 48/06* (2013.01); *F16H 48/08* (2013.01)

(58) Field of Classification Search
CPC ...... F16H 37/0813; F16H 48/06; F16H 48/08; B60K 17/16; B60K 17/348; B64D 35/04
USPC ................................................ 475/225, 331
See application file for complete search history.

(56) References Cited

U.S. PATENT DOCUMENTS

| | | | | |
|---|---|---|---|---|
| 2,158,320 A | * | 5/1939 | Bock ...................... | B60K 17/36 180/24.08 |
| 2,296,006 A | * | 9/1942 | Wagner .................. | B64D 35/04 244/53 R |
| 3,115,936 A | * | 12/1963 | Blews, Jr. ............. | B64D 35/04 416/120 |
| 4,779,699 A | * | 10/1988 | Hatano .............. | B60K 17/3462 180/248 |
| 4,973,296 A | * | 11/1990 | Shibahata .............. | B60K 23/04 475/203 |
| 6,629,474 B2 | * | 10/2003 | Williams ............... | B60K 23/08 180/248 |
| 9,108,511 B2 | * | 8/2015 | Janson ................... | B60K 23/08 |
| 9,177,672 B2 | * | 11/2015 | Hendrickson ........ | G11C 29/806 |

(Continued)

FOREIGN PATENT DOCUMENTS

| | | |
|---|---|---|
| CN | 104896049 A | 9/2015 |
| CN | 106184731 A | 12/2016 |

(Continued)

*Primary Examiner* — Leslie A Nicholson, III

(57) ABSTRACT

A power transmission system includes a power source, a first power transmission distribution device, a first load and a second load. A power outputted by the power source is transmitted to the first power transmission distribution device, is divided into a first transmission power and a second transmission power through the first power transmission distribution device, and is transmitted to the first load and the second load, respectively. The transmission direction for the power to be inputted to a first power input end is perpendicular to the transmission direction of the first transmission power and the second transmission power, and the transmission direction of the first transmission power is opposite to the transmission direction of the second transmission power.

18 Claims, 1 Drawing Sheet

(56) References Cited

U.S. PATENT DOCUMENTS

| | | | | |
|---|---|---|---|---|
| 9,347,541 | B2* | 5/2016 | Brooks | F16H 48/10 |
| 9,676,488 | B2* | 6/2017 | Alber | B64C 29/02 |
| 9,688,397 | B2* | 6/2017 | Smith | B64C 29/0033 |
| 2017/0253331 | A1* | 9/2017 | Nakashima | B64C 27/08 |
| 2018/0030887 | A1* | 2/2018 | Zhao | B64C 27/08 |
| 2018/0155019 | A1* | 6/2018 | Lee | B64C 27/59 |
| 2018/0290735 | A1* | 10/2018 | Uptigrove | B64D 35/04 |
| 2018/0334243 | A1* | 11/2018 | Lin | B64C 11/48 |

FOREIGN PATENT DOCUMENTS

| | | |
|---|---|---|
| CN | 206485572 U | 9/2017 |
| EP | 2930398 A1 | 10/2015 |
| JP | H8296710 A | 8/1996 |
| JP | H11208595 A | 8/1999 |

\* cited by examiner

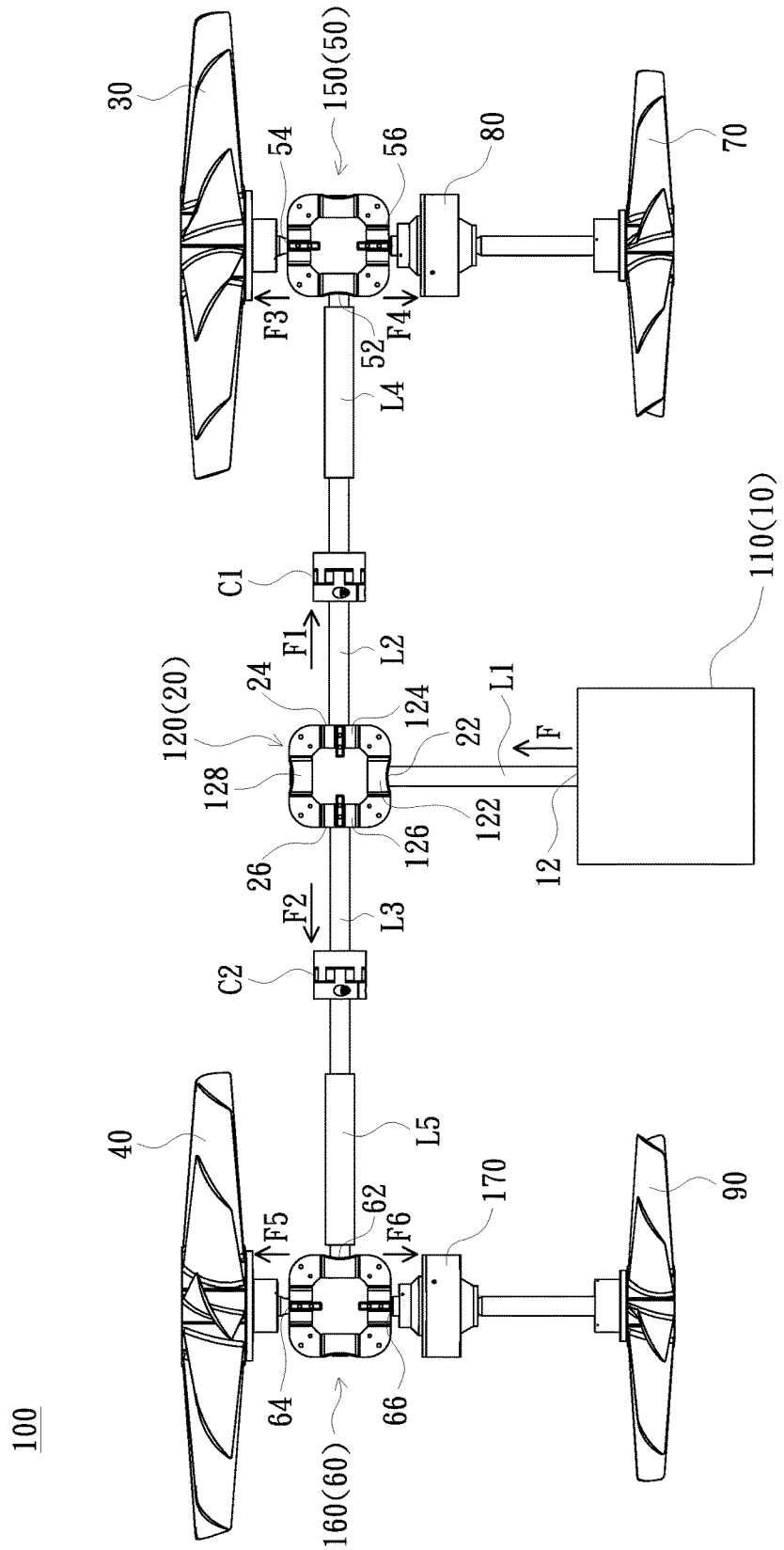

POWER TRANSMISSION SYSTEM

FIELD OF THE INVENTION

The present invention relates to a power transmission system, and more particularly to a power transmission system which can transmit a power toward at least two different directions.

BACKGROUND OF THE INVENTION

Flying into the sky is not only a human dream but also a very efficient mode of transportation. It possesses the efficiency of quickly arriving at the destination. Therefore, it can remove the gap between people caused by space. Consequently, flying is not only with entertainment and business nature, but also with a further great demand for other applications.

For a fixed-wing aircraft, it is true that it can carry a large number of personnel and goods, but such a vehicle needs a long runway and a lot of related takeoff and landing equipment, thus only confined to the airport takeoff and landing. To overcome this restriction, a rotorcraft, such as a helicopter, which is capable of vertical takeoff and landing, is additionally developed. But even if for a rotorcraft capable of vertical takeoff and landing, a considerable area of apron still needs to be set up and it is unable to pickup and drop off passengers like a ground vehicle. Moreover, it is still difficult for a helicopter to enter a narrow passageway and an ordinary roof in the metropolis with high-density buildings.

Therefore, there have currently been research and development teams starting to research and develop single vertical lift aircrafts available to be used in the metropolis with high-density buildings and narrow space. Some of currently known single vertical lift aircrafts use a single propeller, while a plurality of propellers, generally with double propeller, four propeller and other different types, can be disposed to get bigger thrust. However, the volume of a single vertical lift aircraft is quite limited. If a plurality of propellers are disposed, it is inevitably impossible to be like a fixed-wing aircraft to equip each propeller with an individual engine. Instead, it is hoped to use an engine to simultaneously drive a plurality of propellers. Therefore, it is an important issue how to distribute and transmit the power of an engine to each propeller.

SUMMARY OF THE INVENTION

The present invention provides a power transmission system, disposed with a plurality of power distribution transmission devices, evenly distributing and transmitting the power of a power source to a plurality of loads. While applied to a lightweight flying vehicle, such as a single aircraft, a power of an engine can be evenly distributed and transmitted to a plurality of propellers to produce thrust by using a power gear box.

Other objectives and advantages of the present invention will become apparent from the technical features disclosed in the present invention.

In order to achieve one or part or all of the above objectives or other objectives, an embodiment of a power transmission system of the present invention includes a power source, a first power transmission distribution device, a first load, and a second load. The power source has a power output end for outputting a power. The first power transmission distribution device has a first power input end, a first power transmitting end and a second power transmitting end. The first power input end is coupled to the power output end of the power source. The power is divided into a first transmission power and a second transmission power after being inputted from the power output end to the first power input end. The first transmission power is transmitted to the first power transmitting end. The second transmission power is transmitted to the second power transmitting end. The first load is coupled to the first power transmitting end. The first transmission power is inputted to the first load. The second load is coupled to the first power transmitting end. The second transmission power is inputted to the second load.

In an embodiment of the present invention, a power transmission system of the present invention further comprises a second power transmission distribution device, having a second power input end, a third power transmitting end and a fourth power transmitting end. The second power input end is coupled to the first power transmitting end. The third power transmitting end is coupled to the first load. The first transmission power is inputted from the first power transmitting end to the second power input end and drives the first load through the third power transmitting end.

In an embodiment of the present invention, the power transmission system of the present invention further comprises a third power transmission distribution device, having a third power input end, a fifth power transmitting end and a sixth power transmitting end. The third power input end is coupled to the second power transmitting end. The fifth power transmitting end is coupled to the second load. The second transmission power is inputted from the second power transmitting end to the third power input end and drives the second load through the fifth power transmitting end.

In an embodiment of the present invention, the power transmission system of the present invention further comprises a second power transmission distribution device and a third load. The second power transmission distribution device has a second power input end, a third power transmitting end and a fourth power transmitting end. The second power input end is coupled to the first power transmitting end. The third power transmitting end is coupled to the first load. The third load is coupled to the fourth power transmitting end. The first transmission power is divided into a third transmission power and a fourth transmission power after being inputted from the first power transmitting end to the second power input end. The third transmission power is transmitted to the first load through the third power transmitting end. The fourth transmission power is transmitted to the third load through the fourth power transmitting end.

In an embodiment of the present invention, the power transmission system of the present invention further comprises a third power transmission distribution device and a fourth load. The third power transmission distribution device has a third power input end, a fifth power transmitting end and a sixth power transmitting end. The third power input end is coupled to the second power transmitting end. The fifth power transmitting end is coupled to the second load. The fourth load is coupled to the sixth power transmitting end. The second transmission power is divided into a fifth transmission power and a sixth transmission power after being inputted from the second power transmitting end to the third power input end. The fifth transmission power is transmitted to the second load through the fifth power transmitting end. The sixth transmission power is transmitted to the fourth load through the sixth power transmitting end.

In an embodiment of the present invention, the power transmission system further comprises a first transmission shaft, a second transmission shaft and a third transmission shaft. The power is torque. The power output end is connected to the first power input end by the first transmission shaft. The first power transmitting end is coupled to the first load through the second transmission shaft. The second power transmitting end is coupled to the second load through the third transmission shaft.

In an embodiment of the present invention, the power source includes an engine. The first power transmission distribution device includes a first power gear box. The first power gear box includes a first bevel gear, a second bevel gear, and a third bevel gear. The first bevel gear is engaged to the second bevel gear and the third bevel gear. The first bevel gear is connected to the first transmission shaft, the second bevel gear is connected to the second transmission shaft, and the third bevel gear is connected to the third transmission shaft.

A power transmission system of the present invention transmits a power of a power source toward two different directions by using a first power transmission distribution device, while the transmitted power in one direction can be transmitted to two different loads toward another two different directions by further using a second power transmission distribution device or a third power transmission distribution device. Thus, the power of a power source can be transmitted to a plurality of loads.

BRIEF DESCRIPTION OF THE DRAWINGS

The present invention will become more readily apparent to those ordinarily skilled in the art after reviewing the following detailed description and accompanying drawings, in which:

FIG. 1 is a schematic view of an embodiment of a power transmission system of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIG. 1, illustrating an embodiment of a power transmission system of the present invention. The power transmission system 100 of the present embodiment includes a power source 10, a first power transmission distribution device 20, a first load 30 and a second load 40. The power source 10 has a power output end 12, for outputting the power F. The first power transmission distribution device 20 has a first power input end 22, a first power transmitting end 24 and a second power transmitting end 26. The first power input end 22 is coupled to the power output end 12 of the power source 10. The power F is divided into the first transmission power F1 and the second transmission power F2 after being inputted from the power output end 12 to the first power input end 22. The first transmission power F1 is transmitted to the first power transmitting end 24. The second transmission power F2 is transmitted to the second power transmitting end 26. The first load 30 is coupled to the first power transmitting end 24. The first transmission power F1 is inputted from the first power transmitting end 24 to the first load 30. The second load 40 is coupled to the second power transmitting end 26. The second transmission power F2 is inputted from the second power transmitting end 26 to the second load 40. In the present embodiment, the transmission direction for the power F to be inputted to the first power input end 22 is perpendicular to the transmission direction of the first transmission power F1 and the second transmission power F2, and the transmission direction of the first transmission power F1 is opposite to the transmission direction of the second transmission power F2.

In the present embodiment, the power source 10 includes an engine 110. The power F outputted by the engine 110 is torque. The power transmission system 100 includes, for example, a first transmission shaft L1, a second transmission shaft L2 and a third transmission shaft L3. The power output end 12 can be connected to the first power input end 22 by the first transmission shaft L1, the first power transmitting end 24 can be coupled to the first load 30 through the second transmission shaft L2, and the second power transmitting end 26 can be coupled to the second load 40 through the third transmission shaft L3. The first power transmission distribution device 20 includes, for example, a first power gear box 120. The first power gear box 120 includes a first bevel gear 122, a second bevel gear 124, a third bevel gear 126 and a fourth bevel gear 128. The first bevel gear 122 is engaged to the second bevel gear 124 and the third bevel gear 126. The fourth bevel gear 128 is disposed opposite to the first bevel gear 122 and is also engaged to the second bevel gear 124 and the third bevel gear 126. The first bevel gear 122 is connected to the first transmission shaft L1, the second bevel gear 124 is connected to the second transmission shaft L2 and the third bevel gear 126 is connected to the third transmission shaft L3, while the fourth bevel gear 128 is, for example, an idler, to balance the spins of the second bevel gear 124 and the third bevel gear 126. By this way the torque produced by the engine 110 is transmitted from the power output end 12 (output shaft) through the first transmission shaft L1 to the input shaft (the first power input end 22) of the first bevel gear 122 of the first power gear box 120, by this way to make the first bevel gear 122 spin and to make the second bevel gear 124 and the third bevel gear 126 spin accordingly, to divide the power F into the first transmission power F1 and the second transmission power F2, which are respectively transmitted from the output shaft (the first power transmitting end 24) of the second bevel gear 124 and the output shaft (the second power transmitting end 26) of the third bevel gear 126 through the second transmission shaft L2 and the third transmission shaft L3 to the first load 30 and the second load 40. In the present embodiment, the first load 30 is a propeller and the second load 40 is also a propeller.

In addition, in the case of longer transmission distance, the first power transmitting end 24 can also further add, in addition to the second transmission shaft L2, the fourth transmission shaft L4 which is coupled to the first load 30. The second transmission shaft L2 is connected to the fourth transmission shaft L4 by the first shaft connecting member C1. The second power transmitting end 26 can also further add, in addition to the third transmission shaft L3, the fifth transmission shaft L5 which is coupled to the second load 40. The third transmission shaft L3 is connected to the fifth transmission shaft L5 by the second shaft connecting member C2. In the present embodiment, the first shaft connecting member C1 can be a shaft coupling, and the second shaft connecting member C2 can be a shaft coupling. In another embodiment, the first shaft connecting member C1 can be a universal joint, and the second shaft connecting member C2 can be a universal joint.

In the present embodiment, the power transmission system 100 may further include a second power transmission distribution device 50. The second power transmission distribution device 50 has a second power input end 52, a third power transmitting end 54 and a fourth power transmitting end 56. The second power input end 52 is coupled to the first power transmitting end 24. The third power transmitting end 54 is coupled to the first load 30. The first transmission power F1 is inputted from the first power transmitting end 24 to the second power input end 52, and is transmitted to the first load 30 through the third power transmitting end 54. In the present embodiment, the second power transmission distribution device 50 is disposed between the fourth transmission shaft L4 and the first load 30. The second power transmission distribution device 50 includes, for example, a second power gear box 150. The second power gear box 150 includes a plurality of bevel gears. The structure of the second power gear box 150 can be the same as or different from the structure of the first power gear box 120. In the present embodiment, the fourth transmission shaft L4 is connected to the input shaft of the bevel gears of the second power gear box 150, to transmit by the engagement of the bevel gears. In the present embodiment, the transmission direction for the first transmission power F1 to be inputted to the second power input end 52 is perpendicular to the power transmission direction of the third power transmitting end 54 and the fourth power transmitting end 56, the power transmission direction of the third power transmitting end 54 is opposite to the power transmission direction of the fourth power transmitting end 56, and the power transmission direction of the third power transmitting end 54 is the same as the transmission direction for the power to be inputted to the first power input end 12. In this way, after inputted to the second power gear box 150, the first transmission power F1 is transmitted to the first load 30 through the second power gear box 150 to drive the propeller to spin to produce thrust.

Similarly, the power transmission system 100 can further include a third power transmission distribution device 60. The third power transmission distribution device 60 has a third power input end 62, a fifth power transmitting end 64 and a sixth power transmitting end 66. The third power input end 62 is coupled to the second power transmitting end 26. The fifth power transmitting end 64 is coupled to the second load 40. The second transmission power F2 is transmitted from the second power transmitting end 26 to the third power input end 62 and drives the second load 40 through the fifth power transmitting end 64. In the present embodiment, the third power transmission distribution device 60 is disposed between the fifth transmission shaft L5 and the second load 40. The third power transmission distribution device 60 includes a third power gear box 160. The third power gear box 160 includes a plurality of bevel gears. The structure of the third power gear box 160 can be the same as or different from the structure of the first power gear box 120. In the present embodiment, the fifth transmission shaft L5 is connected to the input shaft of the bevel gear of the third power gear box 160 to transmit by the engagement of the bevel gears. In the present embodiment, the transmission direction for the second transmission power F2 to be inputted to the third power input end 62 is perpendicular to the power transmission direction of the fifth power transmitting end 64 and the sixth power transmitting end 66, the power transmission direction of the fifth power transmitting end 64 is opposite to the power transmission direction of the sixth power transmitting end 66, and the power transmission direction of the fifth power transmitting end 64 is the same as the transmission direction for the power to be inputted to the first power input end 12.

In the present embodiment, the power transmission system 100 can further include a third load 70. The third load 70 is coupled to the fourth power transmitting end 56. The first transmission power F1 is divided into a third transmission power F3 and a fourth transmission power F4 after being inputted from the first power transmitting end 24 to the second power input end 52 of the second power transmission distribution device 50. The third transmission power F3 is transmitted to the first load 30 through the third power transmitting end 54 of the second power transmission distribution device 50. The fourth transmission power F4 is transmitted to the third load 70 through the fourth power transmitting end 56 of the second power transmission distribution device 50. In the present embodiment, the third load 70 is a propeller, while the second power transmission distribution device 50 is a power gear box as described above.

In addition, in the present embodiment, the power transmission system 100 can further include a first transmission 80. The first transmission 80 is coupled to the fourth power transmitting end 56 and the third load 70. The fourth transmission power F4 is transmitted through the fourth power transmitting end 56 to the third load 70 after passing through the first transmission 80. In the present embodiment, the first transmission 80 includes a planetary gear system. The spin rate of the fourth power transmitting end 56 (the output shaft of the bevel gear of the power gear box) can be changed by the planetary gear system, to make the spin rate of the third load 70 different from the spin rate of the first load 30. In the present embodiment, the first transmission 80 is an accelerator, to make the spin rate of the third load 70 be a multiple of the spin rate of the first load 30.

In the present embodiment, the power transmission system 100 can further include a fourth load 90. The fourth load 90 is coupled to the sixth power transmitting end 66. The second transmission power F2 is divided into a fifth transmission power F5 and a sixth transmission power F6 after being inputted from the second power transmitting end 26 to the third power input end 62. The fifth transmission power F5 is transmitted to the second load 40 through the fifth power transmitting end 64. The sixth transmission power F6 is transmitted to the fourth load 90 through the sixth power transmitting end 66. In the present embodiment, the fourth load 90 is a propeller, while the third power transmission distribution device 60 is a power gear box as described above.

In the present embodiment, the power transmission system 100 can further include a second transmission 170, coupled to the sixth power transmitting end 66 and the fourth load 90. The sixth transmission power F6 is transmitted through the sixth power transmitting end 66 to the fourth load 90 after passing through the second transmission 170. In the present embodiment, the second transmission 170 includes a planetary gear system. The spin rate of the sixth power transmitting end 66 (the output shaft of the bevel gear of the power gear box) can be changed by the planetary gear system, to make the spin rate of the four load 90 different from the spin rate of the second load 40. In the present embodiment, the second transmission 170 is an accelerator, to make the spin rate of the fourth load 90 be a multiple of the spin rate of the second load 40.

The power transmission system 100 of the present invention can transmit the power of the power source 10 (engine 110) toward two different directions by using the first power transmission distribution device 20 (power gear box 120). The power transmitted toward one direction can be transmitted to two different loads toward another two different directions by further using the second power transmission distribution device 50 or the third power transmission distribution device 60, respectively. Thus, a power of the power source 10 can be transmitted to a plurality of loads. When applied to a single aircraft, the power of the engine 110 can be transmitted to the two propellers on the left and right sides of the engine 110 (double propeller model, the third load 70 and the fourth load 90 not used), or the power of the engine 110 can be transmitted to the four propellers on the left and right sides of the engine 110 (four-propeller model, as shown by the present embodiment), it can even be applied to an aircraft with more than four propellers. In addition, the length of the transmission shaft can be increased by using the first shaft connection C1 and the second shaft connection C2, in the meanwhile, because there will be issues of vibrations when flying, the structure using a shaft connection to connect two transmission shafts is also relatively easy to withstand vibration and not easily damaged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power transmission system, comprising:
   a power source, having a power output end, for outputting a power;
   a first power transmission distribution device, having a first power input end, a first power transmitting end and a second power transmitting end, wherein the first power input end is coupled to the power output end of the power source, the power is divided into a first transmission power and a second transmission power after being inputted from the power output end to the first power input end, the first transmission power is transmitted to the first power transmitting end, and the second transmission power is transmitted to the second power transmitting end;
   a first load, coupled to the first power transmitting end, wherein the first transmission power is inputted to the first load from the first power transmitting end;
   a second load, coupled to the second power transmitting end, wherein the second transmission power is inputted to the second load from the second power transmitting end;
   a second power transmission distribution device, wherein the first load is coupled to the first power transmitting end through the second power transmission distribution device, the second power transmission distribution device has a second power input end, a third power transmitting end and a fourth power transmitting end, wherein the second power input end is coupled to the first power transmitting end, and the third power transmitting end is coupled to the first load;
   a third load, coupled to the fourth power transmitting end, wherein the first transmission power is divided into a third transmission power and a fourth transmission power after being inputted from the first power transmitting end to the second power input end, the third transmission power transmitted to the first load through the third power transmitting end, and the fourth transmission power transmitted to the third load through the fourth power transmitting end; and
   a first transmission, coupled to the fourth power transmitting end and the third load, wherein the fourth transmission power is transmitted through the fourth power transmitting end and to the third load after passing through the first transmission.

2. The power transmission system according to claim 1, wherein a transmission direction of inputting the power to the first power input end is perpendicular to transmission directions of the first transmission power and the second transmission power, and the transmission direction of the first transmission power is opposite to the transmission direction of the second transmission power.

3. The power transmission system according to claim 1, further comprising a second power transmission distribution device, wherein the first load is coupled to the first power transmitting end through the second power transmission distribution device, wherein the second power transmission distribution device has a second power input end, a third power transmitting end and a fourth power transmitting end, the second power input end is coupled to the first power transmitting end, the third power transmitting end is coupled to the first load, the first transmission power is inputted from the first power transmitting end to the second power input end and drives the first load through the third power transmitting end.

4. The power transmission system according to claim 3, wherein a transmission direction of inputting the first transmission power to the second power transmitting end is perpendicular to transmission directions of the third power transmitting end and the fourth power transmitting end, the transmission direction of the third power transmitting end is opposite to the transmission direction of the fourth power transmitting end, and the power transmission direction of the third power transmitting end is the same as the transmission direction of inputting the power to the first power input end.

5. The power transmission system according to claim 2, further comprising a third power transmission distribution device, wherein the second load is coupled to the second power transmitting end through the third power transmission distribution device, the third power transmission distribution device has a third power input end, a fifth power transmitting end and a sixth power transmitting end, the third power input end is coupled to the second power transmitting end, the fifth power transmitting end is coupled to the second load, the second transmission power is inputted from the second power transmitting end to the third power input end and drives the second load through the fifth power transmitting end.

6. The power transmission system according to claim 5, wherein a transmission direction of inputting the second transmission power to the third power input end is perpendicular to power transmission directions of the fifth power transmitting end and the sixth power transmitting end, the power transmission direction of the fifth power transmitting end is opposite to the power transmission direction of the sixth power transmitting end, and the power transmission direction of the fifth power transmitting end is the same as the transmission direction of inputting the power to the first power input end.

7. The power transmission system according to claim 1, wherein the second power transmission distribution device comprises a second power gear box, the second power gear box comprises a plurality of bevel gears, the bevel gears are engaged to each other, the first transmission is an accelerator and comprises a planetary gear system, and the third load is a propeller.

8. The power transmission system according to claim 1, further comprising a third power transmission distribution device and a fourth load, wherein the second load is coupled to the second power transmitting end through the third power transmission distribution device, the third power transmission distribution device has a third power input end, a fifth power transmitting end and a sixth power transmitting end, the third power input end is coupled to the second power transmitting end, the fifth power transmitting end is coupled to the second load, the fourth load is coupled to the sixth power transmitting end, the second transmission power is divided into a fifth transmission power and a sixth transmission power after being inputted from the second power transmitting end to the third power input end, the fifth transmission power is transmitted to the second load through the fifth power transmitting end, and the sixth transmission power is transmitted to the fourth load through the sixth power transmitting end.

9. The power transmission system according to claim 8, further comprising a second transmission, coupled to the sixth power transmitting end and the fourth load, wherein the sixth transmission power is transmitted through the sixth power transmitting end and to the fourth load after passing through the second transmission.

10. The power transmission system according to claim 9, wherein the third power transmission distribution device comprises a third power gear box, the third power gear box comprises a plurality of bevel gears, the bevel gears are engaged to each other, the second transmission is an accelerator and comprises a planetary gear system, and the fourth load is a propeller.

11. The power transmission system according to claim 1, further comprising a third power transmission distribution device and a fourth load, wherein the second load is coupled to the second power transmitting end through the third power transmission distribution device, the third power transmission distribution device has a third power input end, a fifth power transmitting end and a sixth power transmitting end, the third power input end is coupled to the second power transmitting end, the fifth power transmitting end is coupled to the second load, the fourth load is coupled to the sixth power transmitting end, the second transmission power is divided into a fifth transmission power and a sixth transmission power after being inputted from the second power transmitting end to the third power input end, the fifth transmission power is transmitted to the second load through the fifth power transmitting end, and the sixth transmission power is transmitted to the fourth load through the sixth power transmitting end.

12. The power transmission system according to claim 11, further comprising a second transmission, coupled to the sixth power transmitting end and the fourth load, wherein the sixth transmission power is transmitted through the sixth power transmitting end and to the fourth load after passing through the second transmission.

13. The power transmission system according to claim 12, wherein the third power transmission distribution device comprises a third power gear box, the third power gear box comprises a plurality of bevel gears, the bevel gears are engaged to each other, the second transmission is an accelerator and comprises a planetary gear system, and the fourth load is a propeller.

14. The power transmission system according to claim 1, wherein the power is torque, the power transmission system further comprises a first transmission shaft, a second transmission shaft and a third transmission shaft, the power output end is connected to the first power input end by the first transmission shaft, the first power transmitting end is coupled to the first load through the second transmission shaft, and the second power transmitting end is coupled to the second load through the third transmission shaft.

15. The power transmission system according to claim 14, further comprising a fourth transmission shaft, a fifth transmission shaft, a first shaft connecting member and a second shaft connecting member, wherein the first power transmitting end is coupled to the first load further through the fourth transmission shaft, the second transmission shaft is connected to the fourth transmission shaft by the first shaft connecting member, the second power transmitting end is further coupled to the second load through the fifth transmission shaft, and the third transmission shaft is connected to the fifth transmission shaft by the second shaft connecting member.

16. The power transmission system according to claim 15, wherein the first shaft connecting member is a shaft coupling and the second shaft connecting member is a shaft coupling.

17. The power transmission system according to claim 14, wherein the power source comprises an engine, the first power transmission distribution device comprises a first power gear box, the first power gear box comprises a first bevel gear, a second bevel gear and a third bevel gear, the first bevel gear is engaged to the second bevel gear and the third bevel gear, the first bevel gear is connected to the first transmission shaft, the second bevel gear is connected to the second transmission shaft, and the third bevel gear is connected to the third transmission shaft.

18. The power transmission system according to claim 14, wherein the first load is a propeller and the second load is a propeller.

* * * * *